United States Patent [19]
Boucher

[11] Patent Number: 6,079,932
[45] Date of Patent: Jun. 27, 2000

[54] CORROSION RESISTANT SPARE TIRE STORAGE AND RETRIEVAL SYSTEM AND SAFETY LATCH ASSEMBLY FOR A VEHICLE, AND METHOD OF USING SAME

[75] Inventor: Bruce Alan Boucher, Dublin, Ohio

[73] Assignee: Honda Giken Kogyo Kabushiki Kaisha, Tokyo, Japan

[21] Appl. No.: 09/102,153

[22] Filed: Jun. 22, 1998

[51] Int. Cl.$^7$ ................................................. B66D 03/00
[52] U.S. Cl. .................... 414/463; 224/42.23; 294/86.32
[58] Field of Search ..................... 414/462, 463, 414/466; 224/42.12, 42.23, 42.24; 294/116, 86.32

[56] References Cited

U.S. PATENT DOCUMENTS

| | | | |
|---|---|---|---|
| 1,838,400 | 12/1931 | Hornbeck | 294/86.32 |
| 2,397,554 | 4/1946 | Lontz | 294/116 |
| 3,539,152 | 11/1970 | Paul | 414/463 |
| 3,542,413 | 11/1970 | Hardison | 414/463 |
| 3,856,167 | 12/1974 | Yasue . | |
| 4,548,540 | 10/1985 | Renfro | 414/463 |
| 4,884,785 | 12/1989 | Denman . | |
| 4,915,358 | 4/1990 | Stallings . | |
| 5,188,341 | 2/1993 | Greaves . | |
| 5,314,288 | 5/1994 | Schmidt . | |
| 5,669,534 | 9/1997 | Edgerley | 224/42.23 |
| 5,823,413 | 10/1998 | Seltz | 224/402 |

*Primary Examiner*—Gregory A. Morse
*Attorney, Agent, or Firm*—Carrier, Blackman & Associates, P.C.; Joseph P. Carrier; William D. Blackman

[57] ABSTRACT

A support member for supportively holding a spare tire beneath a vehicle includes a platform section having a cutout area formed therein, the cutout area having an upper cutout portion and a lower cutout portion; and an insert which fits engagingly into the cutout area of the support member. The insert includes an upper portion which is dimensioned to fit into the upper cutout portion in the support member, a lower portion which is affixed to the upper portion, the lower portion being of a wider diameter than the upper portion, and one or more structural members for connecting the insert to a cable of a winch assembly. Preferably, the support member includes a seal at the top of the platform section for resisting entry of water therepast. A safety latch assembly for supportively engaging a support member of the above-described type is also disclosed. A release and control apparatus is provided for cooperating with the support member and latch assembly as herein described. A storage and retrieval system for releasably storing a spare tire beneath a vehicle is also disclosed, which generally, includes a support member for supportively holding a spare tire thereon, a winch assembly for raising and lowering the support member between a stored position and an accessible position thereof, the winch assembly including a cable attached to the support member, a safety latch assembly for supportively holding the support member in the stored position independently of the winch assembly, and strategically located sealing members, for resisting entry of water into selected components of the system.

23 Claims, 5 Drawing Sheets

CORROSION RESISTANT SPARE TIRE STORAGE AND RETRIEVAL SYSTEM AND SAFETY LATCH ASSEMBLY FOR A VEHICLE, AND METHOD OF USING SAME

BACKGROUND OF THE INVENTION

1. Field of the Invention

The present invention relates to a safety latching system for a vehicle, such as may be used to fasten a spare tire thereunder. More particularly, the present invention relates to a spare tire storage and retrieval system which includes an improved safety latching system and apparatus, which is resistant to corrosion from the effects of, e.g. weathering, and salt which may be applied to roads.

2. Background Art

Many types of systems and devices have been developed for storing vehicle spare tires out of the way in, or under, vehicles in order to save space. Exemplary designs of systems for storing spare tires, on the undersides of vehicles, may be found in U.S. Pat. Nos. 3,856,167, 4,884,785, 4,915,358, 5,188,341, and 5,314,288.

In U.S. Pat. No. 4,884,785 to Denman et al., an adaptor fitting is shown and described for attaching to the end of a support cable, which may be a multifilament steel cable. The adaptor fitting of Denman has a raised central section, to which the cable is attached, and two integral flanges, which extend laterally outwardly at the bottom of the central section, on opposite sides thereof. The adaptor flange is significantly longer than it is wide.

An adaptor flange of this type is convenient to use, because it can be placed, at an angle, through a central aperture in a spare tire, with one of the flanges leading. This angled placement allows the adaptor to pass easily through the aperture. After the second flange passes through the aperture, the adaptor is then straightened out, so that the flanges fit interferingly and supportively below the metal wheel portion of the spare tire, on opposite sides of the aperture therein, to support and hold the spare tire beneath a vehicle.

A similarly dimensioned and functioning adapter flange to the flange of Denman is disclosed in U.S. Pat. No. 4,915,358 to Stallings.

The use of this type of adapter flange, as disclosed in the Denman and Stallings references, has become common. Unfortunately, this type of adaptor flange suffers from a drawback, in that, while easy to install, once in place, it leaves open gaps on either side thereof, which are open parts of the wheel aperture which are not filled thereby.

U.S. Pat. No. 5,188,341 to Greaves introduced a number of useful improvements over the previously known state of the art, at the time it was introduced. In the spare tire safety latch design of Greaves, a failsafe backup safety latch is provided to hold a spare tire in place beneath a vehicle in the event that a cable breaks. In this design, an adapter flange, which is believed to be of the general type disclosed in Denman and Stallings and discussed above, is used.

In the Greaves reference, the adaptor flange of his apparatus is referred to as a tire carrier, and has a cylindrical shank portion extending upwardly from the central section thereof, with an enlarged head at the top of the shank portion, and a flattened shoulder portion at the junction of the head and the shank portion. A pivoting member is provided, which has a pair of spaced apart latching fingers extending outwardly thereon. During normal use, when a spare tire is stowed beneath a vehicle, these latching fingers are disposed beneath the shoulder portion of the tire carrier.

Accordingly, in the apparatus of Greaves, if the support cable attached to the tire carrier should break, or otherwise fail, the latching fingers will still continue to support the tire beneath the vehicle, until such time as they are moved out of engagement with the tire carrier.

The only way that the latching fingers can be moved out of engagement with the tire carrier, according to the teaching of Greaves, is by inserting a handle end into a hollow cylinder, in a normal sequence of actions taken by a motorist in a process of dismounting the spare tire. When the handle end is inserted into the hollow cylinder, it displaces a pivotally mounted lever, which is linked by a rod to the pivoting member of the latch mechanism. Pivot movement of the lever actuates the rod which moves the pivoting member to back the latching fingers out of engagement with the tire carrier.

While the mechanism disclosed by the Greaves reference has many useful features, including a beneficial safety latch for supporting a spare tire even when a cable fails, it nonetheless includes many metal and other moving parts which are openly exposed to the ambient environment underneath a vehicle.

In certain climates, such as, for example, in the Northeastern U.S. and Canada, road crews commonly spread salt on the roads in the winter to help combat ice and snow thereon. When a particular vehicle, which is equipped with a spare tire that is mounted therebelow, using an adaptor flange of the above-described type, is driven in an environment in which salt is on the road surface, it is entirely possible and foreseeable that corrosive salty water, from the salt-treated roads, may splash up into the spare tire support apparatus, through the aforementioned gaps in the spare tire aperture.

It is well established that salt water has a corrosive effect on metals, and especially on ferrous metals, causing oxidation, rusting, and deterioration thereof. It is therefore evident that an unprotected mechanism supporting a spare tire, beneath a vehicle, may suffer corrosion and deterioration from the effects of such salt water, and may fail if exposed to this type of environment over a period of years. Normal rain water may be corrosive to ferrous metal parts exposed underneath the exterior of a vehicle, and salt water exacerbates and accelerates such normal corrosion.

In a worst case scenario, a latch mechanism such as that taught by the prior art, after a number of years of operation, may become frozen and stuck in place by the effect of rust, and when a user wishes to change a flat tire, the spare may not be removable if parts are inoperable such as, for example, the latching fingers cannot be displaced from engagement with a tire carrier.

Accordingly, a need exists in the art for an improved safety latch for storing a spare tire beneath a vehicle, which includes sealing means for resisting water entry thereinto. More broadly, a need exists in the art for a spare tire storage and retrieval system for use with a spare tire stored beneath a vehicle, in which selected components of the system, which could possibly be compromised over time if exposed to salt water, are sealed from entry of such salt water thereinto.

SUMMARY OF THE INVENTION

Spare Tire Storage and Retrieval System

The present invention provides a storage and retrieval system for releasably storing a spare tire beneath a vehicle. In the preferred practice of the present invention, selected components of the system are provided with protective housings, which enclose moving parts thereof, and which protect those moving parts from exposure to corrosive elements. Preferably, the housings and/or other parts of the system are also provided with sealing means for resisting entry of water thereinto.

A storage and retrieval system in accordance with the present invention, generally, includes a support member for supportively holding a spare tire thereon, a winch assembly attached to the support member for raising and lowering the support member, a safety backup latch assembly for supportively holding the support member in a stored position thereof, and a plurality of sealing means for resisting entry of water into selected components of the system.

Support Member

The present invention provides an improved support member for supportively holding a spare tire beneath a vehicle. The support member makes up one component subassembly of the spare tire storage and retrieval system in accordance with the present invention. A support member in accordance herewith, generally, includes a base, and an insert which fits engagingly into the base.

The base includes a platform section which is provided for central placement below a wheel portion of a spare tire, and for cooperating with the insert to hangingly support a spare tire thereon, beneath a vehicle. The platform section is shaped substantially as a cylinder or disc, with a generally symmetrical cutout area formed in a side and central section thereof, for receiving the insert therein.

Also in the preferred embodiment thereof, the base further includes a shank portion extending upwardly from the center of the platform section, and having a vertical groove formed therein to receive a part of a cable. An enlarged shoulder portion, with an outwardly extending flange, is also provided at the top of the shank portion.

The support member also includes one or more structural components for connecting the insert to a cable or other flexible member of a winch assembly, such as an eyelet fixedly attached to the insert, or an internal anchor pin, which may be attached to a cable inside the insert.

Preferably, the support member includes a seal at the top of the platform section, for cooperating with a wheel portion of a spare tire to resist entry of water therepast. The top surface of the insert may also have a seal thereon.

The support member, in the preferred embodiment of the present invention, is configured to cooperate with a safety latch assembly.

Safety Latch Assembly

The present invention also provides a safety latch assembly for supportively engaging a support member of the above-described type. The safety latch assembly provides another component subassembly of the spare tire storage and retrieval system in accordance with the present invention.

This apparatus may be referred to as a safety backup latch assembly, because it is intended to work in conjunction with, and as a safety backup for, a winch mechanism connected to the support member by a cable.

A safety latch assembly in accordance with the present invention, generally, includes a hollow latch housing having at least one side wall. The latch housing may be cylindrical. The safety latch assembly also includes first and second arm members.

A first arm member is disposed inside the latch housing and pivotally attached to a side wall thereof. The top end of the first arm member is provided with an inwardly projecting first cam thereon, and the bottom end of the first arm member is provided with at least one inwardly extending latching finger thereon for extending below the flange of the support member. Preferably, the bottom end of the first arm member is provided with a pair of horizontally spaced apart latching fingers, for better engagement with the support member than a single latching finger would provide.

An actuator member is attached to the first arm for causing pivotal movement thereof. The actuator member may be a flexible cable, preferably housed in a weather-resistant sheath.

A second arm member is also disposed inside the latch housing and is pivotally attached to a side wall thereof, substantially opposite the first arm member. The physical structure of the second arm member mirrors that of the first arm member in most respects, except as otherwise described herein. Like the first arm member, the second arm member has a top end with an inwardly extending second cam thereon.

However, the second cam is disposed below and adjacent the first cam of the first arm member, for causing pivotal movement of the second arm in response to a movement of the first arm. The second arm member also has a bottom end with at least one inwardly extending latching finger thereon for extending below the flange of the support member.

Pivotal movement of the first arm member, caused by a lateral pulling movement of the actuator member, pushes the first cam thereof down against the second cam, at the top of the second arm member, to pivotally move the second arm member. The bottom end of the second arm member moves outwardly in response to the pressure of the first cam on the second cam.

The concurrent outward movement of the bottom ends of both the first and second arm members moves the latching fingers thereof outwardly in the latch housing, and out of engagement with the support member, releasing the support member from the latch assembly.

Release and Control Apparatus

A release and control apparatus is also provided, for cooperating with the support member and latch assembly as herein described. The release and control apparatus makes up another component subassembly of the spare tire storage and retrieval system hereof.

A release and control apparatus in accordance with the present invention, preferably, includes a control housing, latch release means for operating the safety latch assembly, and rotatable means for operating the winch assembly, the latch release operating means and the rotatable operating means both being disposed in the control housing.

The control housing sealingly encloses and protects the other parts of the release and control apparatus, except as otherwise described herein. The control housing has an inlet formed in an end thereof, for receiving a handle therein, to effect lowering of the support member. Insertion of the handle into the control housing also releases the safety latch assembly.

The release and control apparatus hereof is preferred to include a handle, which has a tubular central body portion for inserting into the housing, and for engaging the mechanism within the control housing.

Accordingly, it is an object of the present invention to provide an improved method and apparatus for storing a spare tire beneath a vehicle, which includes sealing members for resisting entry of water into selected components of the apparatus.

It is another object of the present invention to provide an improved support member for sealingly supporting a spare tire beneath a vehicle, which does not leave air gaps therearound in a wheel aperture of a spare tire.

It is a further object of the present invention to provide an improved spare tire storage and retrieval system, which includes sealing members for resisting entry of water into selected components of the system.

Further objects, features and advantages may be understood from a careful review of the following detailed description section. For a more complete understanding of the present invention, the reader is referred to the following detailed description of presently preferred embodiments of the present invention, which should be read in conjunction with the accompanying drawings. Throughout the following detailed description and in the drawings, like numbers refer to like parts.

DETAILED DESCRIPTION OF THE PRESENTLY PREFERRED EMBODIMENTS

Spare Tire Storage and Retrieval System

Figure 1:
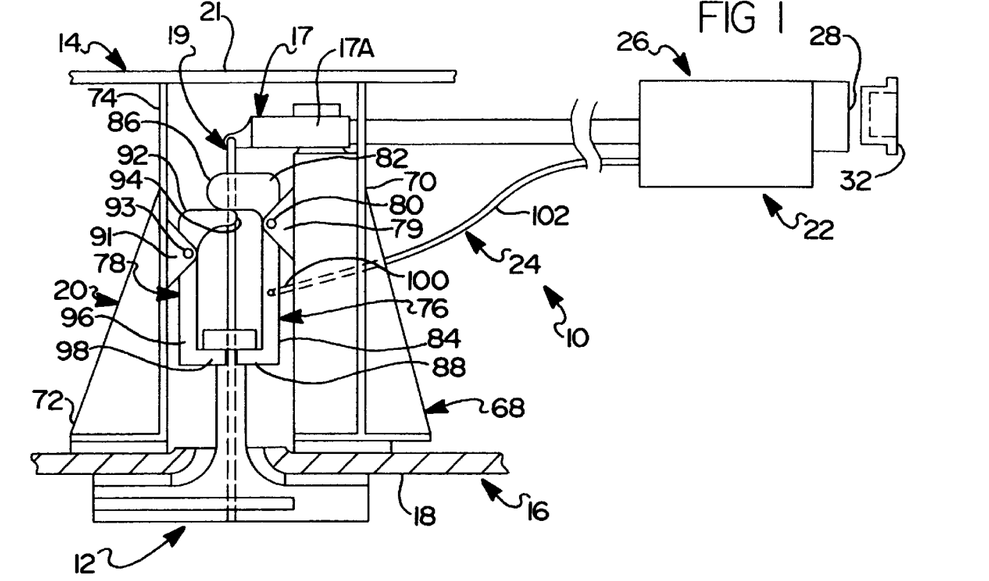
FIG. 1 is a front plan view, partially cut away, of a spare tire storage and retrieval system and apparatus in accordance with a first embodiment of the present invention, showing a safety latch assembly in a closed position.
Figure 2:
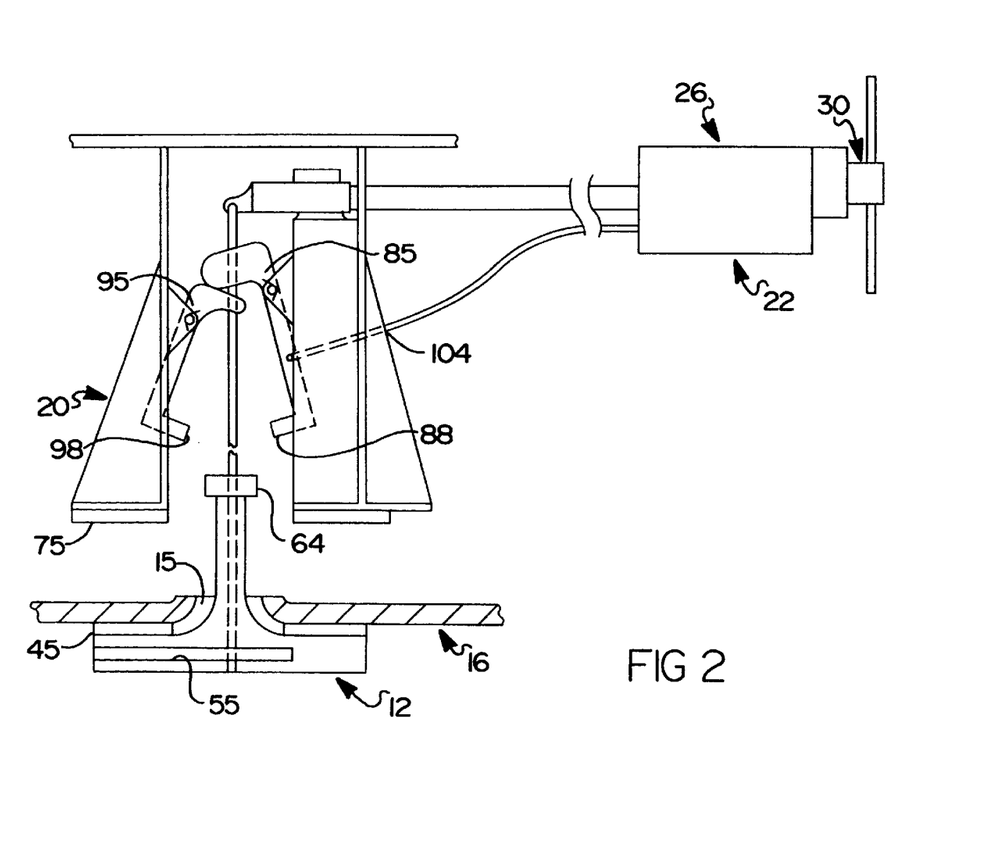
FIG. 2 is a sequential front plan view of the system and apparatus of FIG. 1, at a later time than that of FIG. 1, showing a safety latch assembly in an open position.

Referring now to FIGS. 1–2 of the drawings, a spare tire storage and retrieval system, in accordance with a presently preferred embodiment of the present invention, is shown generally at 10. The storage and retrieval system 10 hereof includes a number of novel features and component subassemblies, as will be further detailed herein.

As used throughout the present specification, and in the claims, the term "spare tire" is intended to mean a tire and wheel assembly 16 including a wheel portion 18, having a hollow central aperture 15 formed therethrough for placement over a wheel hub of a vehicle (not shown). The spare tire 16 is stored with compressed air stored therein, so as to be readily usable when needed by a motorist. This usage of the term "spare tire" is believed to be consistent with the commonly understood meaning of the term, as used in ordinary conversation.

An important feature of the spare tire and retrieval system 10 hereof, is that it includes a plurality of sealing means for resisting entry of water thereinto, as will be specified herein, the sealing means being designed into selected component subassemblies hereof.

The system 10 includes the following important component subassemblies, each of which will be discussed in further detail in the following sections: a support member 12, a winch assembly 17, a safety latch assembly 20, and a release and control apparatus 22.

The support member 12 is provided for placement beneath a vehicle 14, and for supportively and releasably holding a spare tire 16 thereabove. Only a cut away portion of a wheel section 18 of the spare tire is shown in the drawing, but the spare tire 16 is conventional, and does not form a part of the present invention, although the system hereof is intended to be used in cooperation and in conjunction with a spare tire 16.

The winch assembly 17 includes a flexible member such as a winch cable 19, which is supportively attached to the support member 12 for holding the spare tire 16 in place, and for moving the spare tire 16 from a raised, stored position as shown in FIG. 1, to a lowered, accessible position as shown in FIG. 2 for removal of the spare tire 16, such as might be done to replace a flat tire. Many types of winch assemblies are known and commercially available, and the internal mechanism of the winch assembly 17 may be of any conventional type. It is preferred that the winch assembly 17 include a multifilament braided steel, or stainless steel winch cable 19, which is windable on to, and unwindable from, a take-up spool 17A.

The safety latch assembly 20 is provided as a fail-safe mechanism to supportively hold the spare tire 16 independently of the winch assembly 17, event in the event that the winch cable 19 of the winch assembly should break, or otherwise fail. The safety latch assembly is preferably welded on to, bolted to, or otherwise solidly and rigidly affixed to a structural member 21 of a vehicle 14. Preferably, the safety latch assembly 20 includes a latch housing 68 which surrounds and protects the latch mechanism from the outside environment, when used in combination with a spare tire 16.

A release and control apparatus 22 is provided for operating both the winch assembly 17 and the safety latch assembly 20. The release and control apparatus 22 is connected to the safety latch assembly 20 by an actuator member 24. The release and control apparatus 22 includes a control housing 26 which has an inlet 28 for receiving a portion of a handle member 30 (FIGS. 2,9) therein, and when the handle member 30 is in storage, a sealing cap 32 may, optionally, be provided, for sealing insertion into the inlet 28 of the control housing 26.

Support Member

Referring now to FIGS. 1 through 4, in a presently preferred embodiment hereof, the present invention provides an improved support member 12 for cooperating with a winch cable 19 in supportively holding a spare tire 16 (FIG. 1) beneath a vehicle 14.

The support member 12 makes up one component subassembly of the spare tire storage and retrieval system 10 in accordance with the present invention. The support member 12 is formed from a strong material, preferably steel or a non-ferrous material or a high-strength plastic, since it must support the weight of a spare tire 16 thereon for extended periods of time.

A support member 12, in accordance with the present invention, generally, includes a base 34, and an insert 36. The base 34 primarily, and most importantly, includes a platform section 35. The insert 36 fits engagingly into the platform section 35 of the base 34.

The platform section 35 is provided for central placement below a wheel section 18 of a spare tire 16, and for cooperating with the insert 36 to hangingly support a spare tire thereon beneath a vehicle 14, as shown in FIG. 1. The platform section 35 is shaped substantially as a cylinder or disc 38, with a flattened upper surface. The platform section 35 has a generally symmetrical cutout area 40 formed in a side and central section thereof, for receiving the insert 36 therein. The cutout area 40 includes an upper portion 42, and a lower portion 44 which is wider than the upper portion. Preferably, the platform section 35 includes a platform seal 45 affixed to an upper surface of the cylinder 38. The platform seal 45 may be a layer of rubber or other elastomer, and is preferred to be both resilient, and resistant to the passage of water therepast, when placed in abutting relation with a wheel 18 of a spare tire 16, as shown.

As noted, the support member 12 also includes an insert 36. Most preferably, the insert is integrally formed from a single piece of strong material, which fits slidably and engagingly into the cutout area 40 of the platform section 35. The insert 36 includes an upper portion 46, which is dimensioned to fit into the upper portion 42 of the cutout area 40 in the platform section 35. The insert 36 further includes a lower portion 48, which is affixed to the upper portion 46 thereof. The lower portion 48 of the insert 36 fits engagingly in the lower portion 44 of the cutout area 40. The lower portion 48 of the insert 36 is made wider than the upper portion 46, to retain the insert in engagement with the platform section 35, even under a load, and to prevent the platform section 35 from slipping off of the insert. Preferably, the insert also includes an insert seal 49, disposed at the top of the upper portion 46, and made of the same material as the platform seal 45. As shown, when the insert is fitted in the platform section the platform section and the insert jointly define a continuous upper surface for fully closing the central opening of the wheel of the spare tire.

Figure 3:
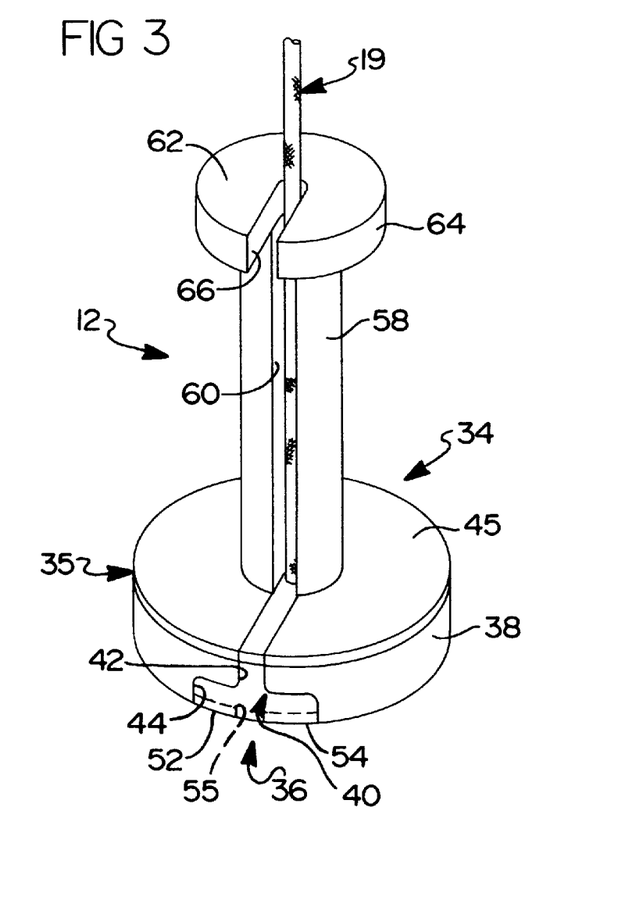
FIG. 3 is a perspective view of a support member which is a component subassembly of the system and apparatus of FIGS. 1–2.
Figure 4:
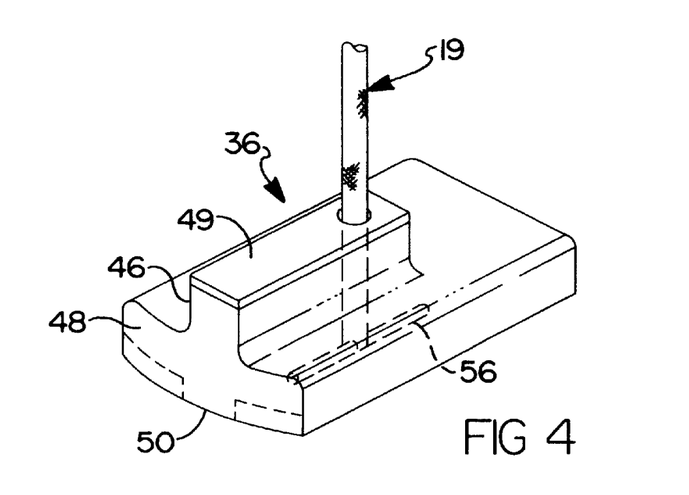
FIG. 4 is a perspective view of an insert, and associated support cable, which is part of the support member of FIG. 3.

Optionally, the insert 36 may have material removed from the lower outermost corners thereof, as shown by the phantom lines in FIGS. 3 and 4, to form a narrow foot 50 at the bottom thereof. Where a narrow foot 50 is used on the insert, the platform section 35 may be correspondingly shaped, with inwardly extending flanges 52, 54 extending into the lower portion 44 of the cutout area 40, defining slots 55 thereabove (FIG. 2) in the sides of the lower portion 44 of the cutout area 40, to more securely retain the insert 36 in slidable engagement therein.

The support member 12 also includes one or more components for connecting the insert 36 to a flexible member, such as the winch cable 19 of the winch assembly 17. The components provided for connecting the insert to a flexible member may include an eyelet (not shown) fixedly attached to the insert, or an internal anchor pin 56 (FIG. 4), which may be attached to the winch cable 19 inside the insert.

Preferred Structure for the Support Member

Optionally and most preferably, the base 34 further includes a shank portion 58 extending upwardly from the center of the platform section 35. The shank portion 58 has a vertical groove 60 formed therein, to nestingly receive an end portion of the winch cable 19 therein. An enlarged shoulder portion 62 is also preferably disposed at the top of the shank portion 58, and where used, the shoulder portion includes an outwardly extending flange 64 at the top of the shank portion. The shoulder portion has a cutout notch 66 formed therein to receive the winch cable 19, and the cutout notch is coextensive with the vertical groove 60 of the shank portion 58. The preferred support member 12 is formed as described, in order to cooperate with the safety latch assembly 20 (FIG. 1) of the present invention.

Method of Using the Support Member

In a method of installing a spare tire on to the support member in accordance with the present invention, the insert 36 is lowered down using a winch assembly 17 to an accessible orientation thereof. Then, the insert 36 is placed, moving from top to bottom, through a central aperture 15 in a wheel portion 16 of a spare tire 18. After the insert 36 has passed completely through the wheel aperture 15, the insert is slidably engaged into the cutout portion 40 of the platform section 35. Then, the support member 12 is raised as a unit with the winch assembly 17 until the platform section 35 contacts the wheel portion 16 of the spare tire 18. Finally, the support member 12, with the spare tire resting on the platform section 35, is raised up with the winch assembly 17 to a stored position beneath the vehicle 14.

Conversely, in order to remove a spare tire from beneath the vehicle, the support member 12 and spare tire 16 are lowered together to an accessible position thereof, as shown in FIG. 2. Then, the spare tire is lifted upwardly relative to the support member 12, to lift the wheel 18 off of the platform section 35 of the support member.

The insert 36 is then slidably removed from the base 34 of the support member; and the spare tire is then moved downwardly relative to the insert, to pass the insert through the wheel aperture, thereby removing the spare tire from the support member.

Safety Latch Assembly

Figure 5:
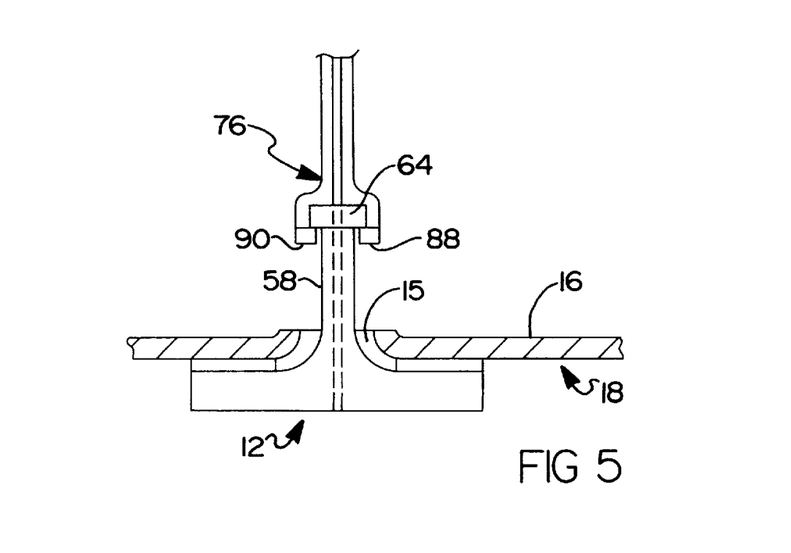
FIG. 5 is a side plan view, partially cut away, of a first arm member which is a part of a safety latch assembly, which is a component subassembly of the system and apparatus of FIGS. 1–2.

Referring now to FIGS. 1, 2, and 5, the present invention also provides a safety latch assembly 20 for supportively engaging a support member 12 of the above-described type. The safety latch assembly 20 provides another component subassembly of the spare tire storage and retrieval system 10 in accordance with the present invention.

This safety latch assembly 20 may be referred to as a safety backup latch assembly, because it is intended to work in conjunction with, and as a safety backup for, a winch assembly 17 connected to the support member 12 by a flexible member, such as a winch cable 19.

A safety latch assembly 20 in accordance with the present invention, generally, includes a hollow latch housing 68 having at least one side wall 70. The latch housing 68 is preferred to be formed from a strong material such as steel, galvanized steel, or non-ferrous materials such as aluminum or a high-strength plastic, and is continuous therearound, without holes or perforations therein except as specifically discussed herein, in order to protect the moving parts of the safety latch assembly 20 from the entry of water thereinto, to preserve the useful life thereof. The housing is welded, riveted, or otherwise rigidly affixed in known fashion to a structural member 21 of a vehicle 14.

The side wall 70 is preferred to be conically slanted, so that the latch housing 68 is wider at the bottom end 72 than at the top end 74 thereof, in order to provide interior space for accommodating outward movement of a pair of first and second arm members 76, 78, respectively, as will be further detailed herein. The latch housing 68 may be in the general shape of an outwardly flared cylinder, as shown, in which case a continuous tapered cylindrical side wall 70 surrounds a hollow space therein, or may be otherwise shaped, with multiple, interconnected, slanting vertical side walls. However, since these multiple side walls (not shown) are interconnected to one another, and must be substantially continuous to be resistant to the entry of water into the housing 68, they may be viewed as a single, continuous side wall 70 for purposes of the present specification and claims.

Most preferably, the safety latch assembly 20 includes a housing seal 75 (FIG. 2) disposed between the bottom surface of the latch housing and the wheel portion 18 of the spare tire 16. The housing seal 75 may be a separate unattached piece which is placed between the latch housing 68 and the wheel 18, or alternatively, the housing seal 75 may be attached to the lower surface of the latch housing, as shown. The housing seal 75 may be a layer of rubber or is other elastomer, and is preferred to be both flexibly resilient, and resistant to the passage of water therepast, when used in conjunction with a spare tire 16. This housing seal 75 cooperates with the platform seal 45 to provide seals on both sides of the wheel portion 18 of the spare tire 16, to resist and minimize entry of water into the safety latch assembly 20, from either above or below the wheel 18.

The safety latch assembly 20 also includes first and second arm members 76, 78. The first and second arm members 76, 78 play a very important role, in supporting the entire weight of the support assembly 12 and the spare tire 16 thereon, in the event that the winch cable 19 fails. Accordingly, it is important that the latch housing 68, arm members 76, 78 and associated connecting hardware be formed of high-strength materials. It is preferred that the arm members 76, 78 be formed from metal such as steel, high-strength steel, or from a non-ferrous material or a high-strength plastic. The use of two opposed arm members 76, 78, instead of a single arm member, allows the housing 68 to be kept small and compact, since each arm member travels only a short distance to clear the flange 64 of the support member 12.

As noted, the first arm member 76 is disposed inside the latch housing 68, and is pivotally attached to the side wall 70 thereof The first arm member 76 may be attached to the side wall 70 through the use of a fist bracket 79 and first pivot pin 80, as shown. The first arm member 76 includes a top end 82 and a bottom end 84. The top end 82 of the first arm member 76 is provided with an inwardly projecting first cam 86, or other operative engaging member, such as teeth, thereon. The bottom end 84 of the first arm member 76 is provided with at least one inwardly extending latching finger 88 thereon, for extending below the flange 64 of the support member 12.

Preferably, as shown in FIG. 5, the bottom end 84 of the first arm member 76 is provided with a pair of horizontally spaced apart latching fingers 88, 90, which fit below the flange 64 of the support member 12, on either side of the shank portion 58 thereof. The first arm member 76 has a spring 85 (FIG. 2) attached thereto adjacent the first bracket 79 for normally urging the bottom end 84 thereof inwardly in the housing 68.

A second arm member 78 is also disposed inside the latch housing 68, and is pivotally attached to the side wall 70 thereof substantially opposite the first arm member 76, as shown in FIGS. 1–2. The second arm member 78 may be attached to the side wall 70 through the use of a second bracket 91 and second pivot pin 93, as shown. The physical structure of the second arm member mirrors that of the first arm member in most respects, except as otherwise described herein. In a manner analogous to the first arm member 76, the second arm member 78 has a top end 92 with an inwardly extending second cam 94 thereon.

However, as shown in the drawings, the second cam 94 is disposed below and adjacent the first cam 86 of the first arm member, for actuating movement thereby, causing pivotal movement of the second arm 78 in response to a movement of the first arm 76.

The second arm member 78 also has a bottom end 96 with at least one inwardly extending latching finger 98 thereon for extending below the flange 64 of the support member 12, opposite the latching finger(s) of the first arm. The preferred structure of the bottom end 96 of the second arm member 78 is substantially identical to the structure of the bottom end 84 of the first arm member 76, as shown and described hereinabove in connection with FIG. 5. As with the first arm member, a pair of horizontally spaced apart latching fingers, identical to those shown at 88, 90 in FIG. 5, are preferred to be provided at the bottom end of the second arm member 78, to engage the flange 64 of the support member 12 on both sides of the shank portion 58 thereof, and to better distribute the weight of the spare tire 16 on the support member 12, should that become necessary. The second arm member 78 also has a spring 95 (FIG. 2) attached thereto adjacent the second bracket 91, for normally urging the lower end 96 thereof inwardly in the housing 68.

During normal storage of a spare tire 18, it is preferred that the winch cable 19 bear the weight of the support member 12 and the spare tire 18 carried thereby, and that the flange 64 of the support member also be spaced slightly above the latching fingers 88, 98 of the arm members 76, 78, so that the arm members may be easily disengaged therefrom.

An actuator member 24 is provided attached to the first arm for causing pivotal movement thereof. The actuator member 24 may be a flexible latch release cable 100, preferably housed in a weather-resistant sheath 102. A small hole 104 (FIG. 2) must be formed in the latch housing 68 to allow entry of the actuator member 24 therein. It is preferred that this hole 104 be made no larger than necessary, and most preferably, a sealer, such as a room temperature vulcanizing silicone sealer, or a rubber grommet (not shown), should be used to seal this hole 104 around the actuator member 24.

Method of Operation of the Safety Latch Assembly

To open the safety latch assembly 20, lateral pulling force is applied to the actuator member 24 to pivotally move the first arm member 76 on the first pivot pin 80, against the force of the first spring 85. Pivotal movement of the first arm member 76, caused by lateral pulling movement of the actuator member 24, moves the bottom end 84 of the first arm member 76 outwardly, while at the same time, moves the top end 82 of the first arm member inwardly in the latch housing 68.

This inward movement of the top end 82 of the first arm member pushes the first cam 86 down against the second cam 94, pivotally moving the second arm member on the second pivot pin 93, against the force of its associated spring 95. The top end 92 of the second arm member moves inwardly, and the bottom end 96 of the second arm member moves outwardly, in response to the downward pressure of the first cam 86 on the second cam 94.

The concurrent outward movement of the bottom ends 84, 96 of the first and second arm members 76, 78 moves the latching fingers 88, 98 thereof outwardly in the latch housing 68, and out of engagement with the flange 64 at the top of the support member 12, releasing the support member 12 from the latch assembly 20.

Alternative Embodiment of the Safety Latch Assembly

Figure 6:
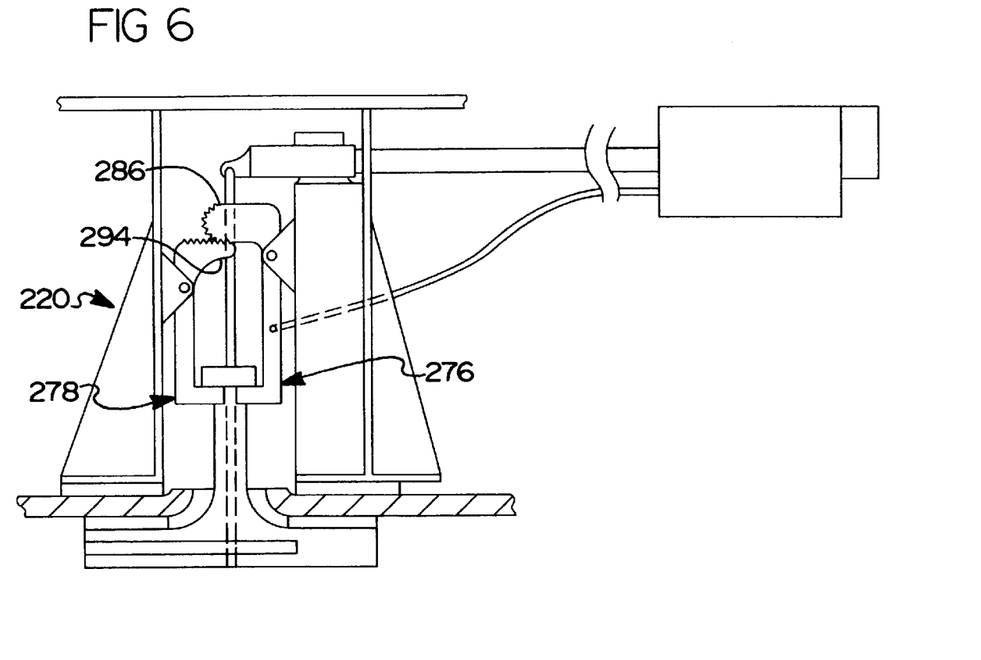
FIG. 6 is a front plan view, partially cut away, of an alternative spare tire storage and retrieval system and apparatus, in accordance with a modified embodiment of the present invention.

Referring now to FIG. 6, it may be seen that an alternative embodiment of the safety latch assembly 220 is shown, in which all components are identical to the safety latch assembly 20 previously described, except that in this embodiment, the first and second cams 286, 294 of the first and second arm members, respectively, have teeth formed thereon which mesh and interengage with one another. These teeth provide positive continuity of engagement of the first and second cam members, to assure coordinated movement thereof.

Release and Control Apparatus

Figure 7:
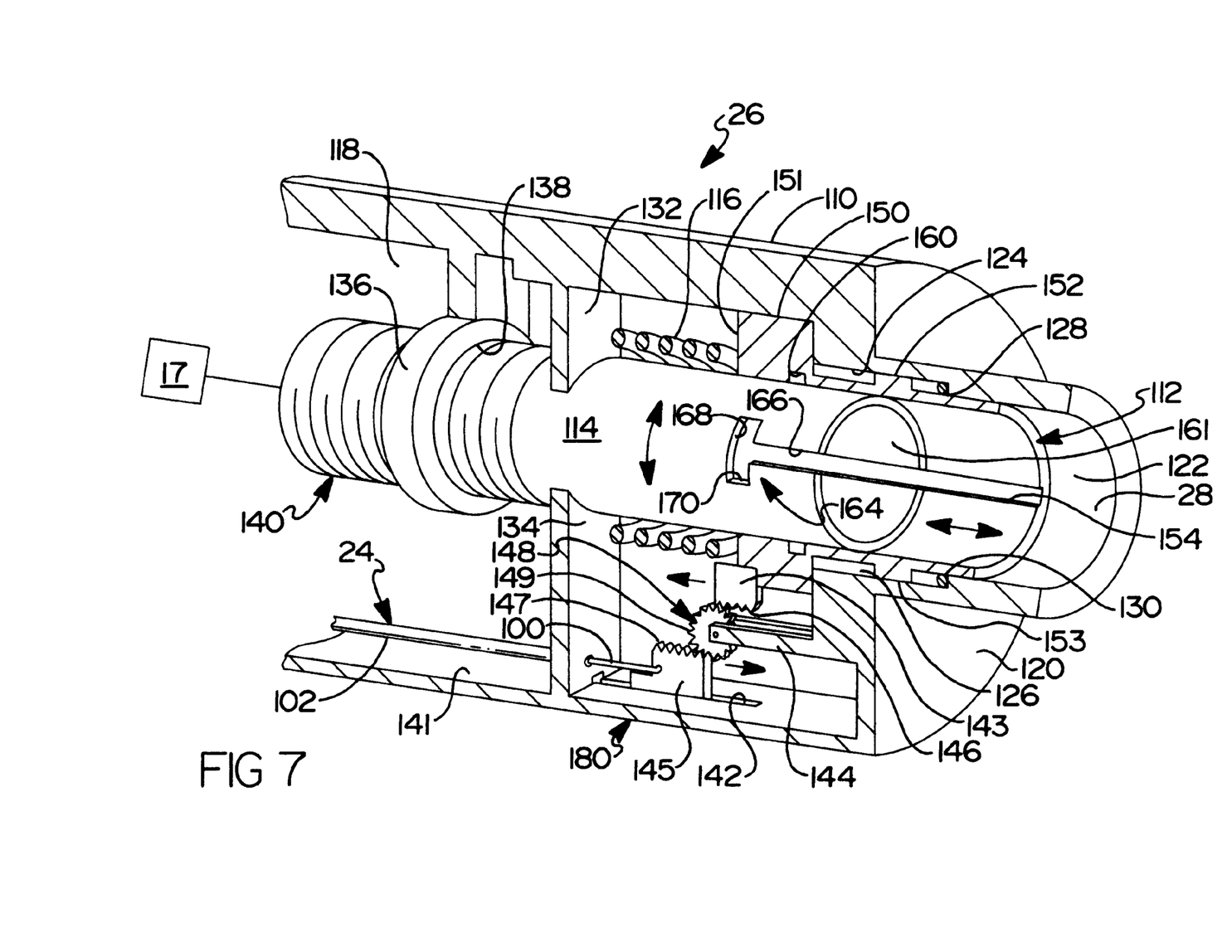
FIG. 7 is a perspective view, partially cut away and partially in cross-section, of a release and control apparatus which is a component subassembly of the system and apparatus of FIGS. 1–2.
Figure 8:
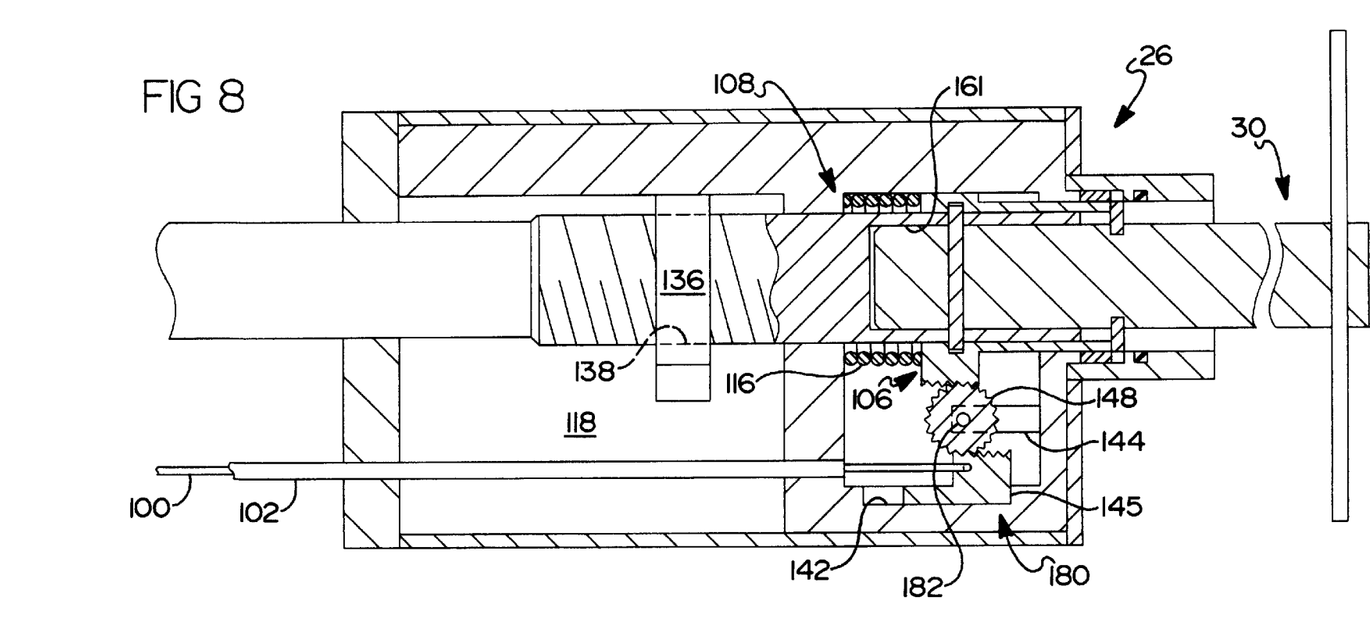
FIG. 8 is a cross-sectional view of the release and control apparatus of FIG. 7, shown at a later time than that of FIG. 7, with a coil spring thereof in a fully compressed position.

Referring now to FIGS. 7 and 8, details of a preferred structure for a release and control apparatus 22 may be seen, for cooperating with the support member 12 and safety latch assembly 20 as herein described. The release and control apparatus 22 makes up another component subassembly of the spare tire storage and retrieval system 10 hereof.

The release and control apparatus 22 hereof includes latch release means 106 (FIG. 8) for operating the safety latch assembly 20, and rotatable means 108 for operating the winch assembly 17. Both the latch release operating means and the rotatable operating means are protectively contained within a substantially sealed control housing 26, to resist corrosion thereof.

A release and control apparatus 22 in accordance with the present invention, preferably, includes a control housing 26, an outer sleeve 112 slidably disposed in the control housing, and an inner sleeve 114 rotatably disposed inside of, and coaxial with, the outer sleeve. A coil spring 116 is also provided, external to the inner sleeve 114, for biasing the outer sleeve 112 outwardly in the housing 110. The release and control apparatus 22 may also include a handle member 30. Each of these main components will be discussed in further detail below.

The Handle Member

The release and control apparatus hereof is preferred to include a handle member 30 (FIG. 9), which has a tubular central body portion 172 with a working end 162 for inserting into the inlet 28 of the control housing 26, and for engaging with the inner sleeve 114 to rotatably move it to operate the winch assembly 17. The working end 162 of the handle has a pair of transverse driver pins 156, 158 affixed thereto for engaging in a T-slot 164 of the inner sleeve 114. The handle member 30 also includes a transverse flange or washer 174, fixedly attached to the central body portion 172, for contacting the outer sleeve 112, and for pushing it inwardly, against the force of the spring 116, to release the safety latch assembly 20. The handle member further includes a handle end 176 opposite the working end 162. The handle end 176 has a grab bar 178 transversely affixed thereto, for grasping and turning thereof by a user.

The Control Housing

As used throughout the present specification in reference to the control housing 26, the terms "outer" and "inner", without other qualifying language such as "axial", is intended to mean toward or away from the inlet 28 thereof, respectively. The inlet 28 is shown on the right in FIGS. 6 and 7, and so a reference to a circumferential groove 130 being located at the "outer end of the guide slots 124, 126" will suggest that the groove in question is located at the ends of the guide slots closest to the inlet 28, or farthest to the right in the drawings. However, and notwithstanding the above, the terms "inner sleeve" and "outer sleeve"only mean that these two cylindrical members are coaxially and telescopically arranged in relation to one another and to the control housing 26.

The control housing 26 includes a hollow shell body 110, which provides a hollow chamber 118 to therewithin to house and to sealingly enclose and protect the various internal parts of the release and control apparatus 22. The shell body 110 of the control housing 26 is continuous around the extent thereof, and impermeable to the entry of water thereinto, except as otherwise described herein. The control housing 26 is preferably made of metal or strong plastic, and may be formed in the general shape of a horizontally oriented cylinder, as shown, since it contains other cylindrical parts, but the exterior shape thereof is not critical to the practice of the present invention.

As noted, the control housing 26 has a hollow inlet 28 formed in a first end 120 thereof, for receiving part of a handle member 30 therein (FIG. 9), to effect releasing of the safety latch apparatus 20, and to cooperate with the winch 17 in raising and lowering the support member 12.

The control housing 26 has a cylindrical bore 122 formed in the first end 120 thereof, in communication with the inlet 28, for slidably receiving the outer sleeve therein. A pair of opposed upper and lower vertical guide slots 124, 126 are formed in the control housing 26 at the top and bottom of the bore 122. Preferably, an O-ring or other annular seal 128 is disposed in a circumferential groove 130 formed inside the cylindrical bore 122 at the outermost end of the guide slots 124, 126.

The control housing 26 also provides a number of supports, slots and other mechanical structures, for cooperation with other component parts of the release and control apparatus, as will be further detailed herein.

The control housing 26 has a pair of opposed first and second pillars 132, 134 disposed approximately centrally therein for supportively and rotatably receiving the inner sleeve 114 therebetween. The first and second pillars 132, 134 approximately bisect the chamber 118 inside the housing. In the depicted embodiment, the first and second pillars 132, 134 are oriented substantially vertically, but they could be otherwise oriented. The outer surfaces of the pillars 132, 134, which face toward the inlet 28, are flattened to provide a solid surface for stopping inward movement of the spring 116, so that it will be compressed by the outer sleeve 112.

The outer sleeve 112 is also attached to a support collar 136 having an internally threaded bore 138 therein, in which a plurality of threads 140, formed on the exterior of the inner sleeve 114, are threadably received. There is a measured and predetermined amount of interference between the external threads 140 of the inner sleeve 114 and the threaded bore 138 of the collar 136, so that the inner sleeve will not rotate therein unless and until a user inserts the handle member 30 into the inner sleeve and applies a turning force thereto.

The control housing 26 has a floor 141 disposed therein, at the bottom of the hollow chamber 118, and a longitudinal slot 142 is formed in the floor of the chamber to slidably receive a second rack member 145 therein, as will be described in further detail below. The control housing 26 may, optionally, further have an integral horizontal post 144 extending inwardly from an outer wall into the hollow chamber 118, below the outer sleeve 112, to support a pinion gear 148 thereon.

The Outer Sleeve

The outer sleeve 112 is a generally hollow, tubular cylinder, with an enlarged cylindrical boss 150 at the innermost end thereof. The cylindrical boss 150 has a generally flattened inner surface 151 for pushing against and compressing the coil spring 116 against the opposed pillar members 132, 134. The outer sleeve 112 also has a pair of opposed first and second tabs 152, 153, respectively, thereon at opposite upper and lower edges thereof. The opposed first and second tabs 152, 153 are slidably disposed in the respective guide slots 124, 126 of the control housing 26, to guide backward and forward slidable movement of the outer sleeve 112 in the control housing 26.

Optionally, the outer sleeve 112 may have a pair of symmetrically disposed, longitudinal access slots formed therein, of which, only one slot 154 may be seen in FIG. 7, since it is a cut away view. These slots are provided to receive a pair of transverse driver pins 156, 158, of the handle member 30 therein. Where these access slots 154 are used, a circumferential annular or helical passage 160 may also be provided inside the cylindrical boss 150, transverse to the access slots at the ends thereof, to provide clearance to allow the driver pins 156, 158 to spin around inside the outer sleeve 112 as the handle member 30 is used to rotate the inner sleeve 114, to operate the winch assembly 17.

Alternatively, the handle member 30 may be constructed and arranged of a size such that the transverse pins 156, 158 thereof are just long enough to fit interferingly inside of the inner sleeve, and to extend to the outer surface thereof when inserted therein, but not so long as to scrape against the inner surface of the outer sleeve 112, so as to require the presence of the access slots 154 or of the circumferential annular or helical passage 160 therein.

The outer sleeve 112 is operatively associated with the actuator member 24 of the safety latch assembly, so that inward movement of the outer sleeve, to the left as shown in FIG. 7, causes a lateral outward pulling movement of the actuator member 24.

The Inner sleeve

Figure 9:
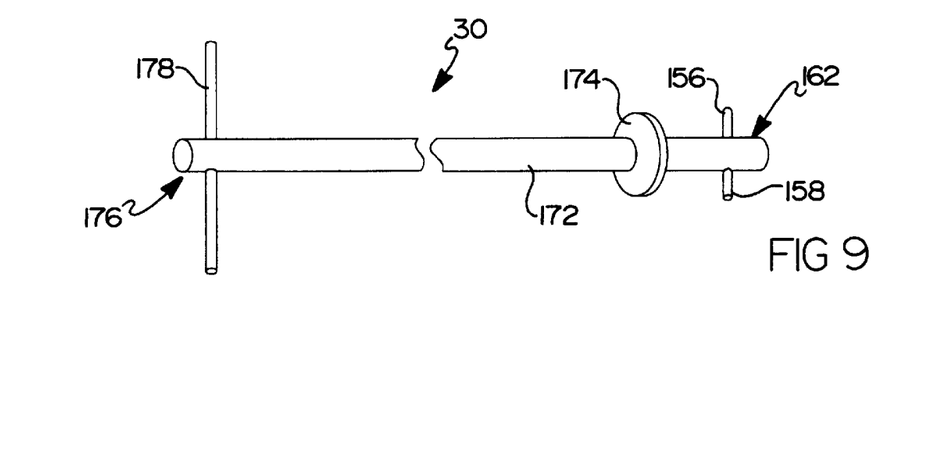
FIG. 9 is a perspective view of a handle member in accordance with the present invention, which is part of the release and control apparatus of FIGS. 7–8.

The inner sleeve 114 is a cylindrical body having a hollow cylindrical coaxial bore 161 formed part way therethrough, for receiving a working end 162 of the handle member 30 (FIG. 9). The inner sleeve 114 is formed of metal or high-strength plastic, and preferably, has a pair of opposed T-slots, such as that shown at 164 in FIG. 7, formed therein. Each of the T-slots 164 includes a longitudinal section 166 formed in the side of the inner sleeve 114, and a pair of transverse sections 168, 170 extending perpendicularly outwardly, in opposite directions, from the end of the longitudinal section 166. The T-slots 164 are provided in the inner sleeve 114 for engagingly receiving the driver pins 156, 158 of the handle assembly 30 therein, to allow rotation of the inner sleeve thereby.

As previously noted, an innermost end of the inner sleeve 114 has a plurality of external threads 140 formed thereon, and these threads fit engagingly and interferingly in a threaded bore 138 formed inside of a support collar 136, which is affixed to the control housing 26.

The inner sleeve 114 is operatively associated with a winch mechanism 17, using appropriate conventional hardware to raise and lower the support member. Rotation of the inner sleeve activates the winch 17 to move the support member either up or down, depending on the direction of rotation thereof. Many designs for winches are known, and any conventional winch mechanism may be used.

The Coil Spring

As noted, a coil spring 116 is provided in the control housing 26, surrounding the inner sleeve 114. The coil spring 116 is behind, in line with, and in contact with the enlarged cylindrical boss of the outer sleeve 112, for biasing the outer sleeve outwardly in the control housing. The inner end of the spring 116 contacts the opposed pillars 132, 134 of the control housing 26. The spring acts to exert an outward pushing force on the outer sleeve 112. Inward movement of the outer sleeve in the control housing, acting against the force of the spring, operates to move the actuator member 24 laterally outwardly, causing the latching fingers 188, 198 of the safety latch assembly 20 to move outwardly in the latch housing, and out of engagement with the support member.

Enclosed Rack and Pinion Subassembly

In a particularly preferred embodiment of the present invention, the release and control apparatus 22 also includes an enclosed rack and pinion subassembly 180, which is preferably also contained within the control housing and sealed against water entry thereinto. In this embodiment, a first rack member 143 is attached to the outer sleeve, preferably at the bottom end thereof. The first rack member 143 has an axially outwardly facing surface 146, with a plurality of axially outwardly pointing teeth thereon.

In this preferred embodiment, the release and control apparatus also includes a pinion gear 148. The pinion gear 148 is rotatably attached to the control housing 26 by an integral horizontal post 144, and by a central pin 182 which passes through the center of the pinion gear 148, and through the horizontal post 144. The pinion gear 148 is disc-shaped, and has an outer peripheral edge 149 with teeth formed therearound. Some of the teeth of the pinion gear 148 are engaged with some of the teeth of the first rack member 143.

A second rack member 145 is slidably mounted in a slot 142 formed in the floor 141 of the control housing 26. The second rack member 145 is located substantially on the opposite side of the pinion gear 148 from the first rack member 143. The second rack member 145 has an axially inwardly facing surface 147 with a plurality of axially inwardly pointing teeth thereon. Some of the teeth of the second rack member 145 are also engaged with the teeth of the pinion gear 148. The second rack member is connected to the actuator member 24, by being affixed to the flexible cable 100 thereof, at an end thereof opposite the safety latch assembly 20.

Method of Operation of the Release and Control Apparatus

The release and control apparatus 22 is operatively associated, via the actuator member, to the safety latch assembly 20 as follows:

First, the working end 162 of the handle member 30 is inserted into the inlet 28 of the control housing 26 by a motorist. The washer 174 on the handle member 30 pushes the sliding outer sleeve 112 inwardly in the control housing 26, in opposition to the force of the coil spring 116. This inward movement of the outer sleeve 112 moves the first rack member 145 and causes rotation of the pinion gear 148. This rotation of the pinion gear, in turn, moves the second rack member 145 in an outward direction, opposite the inward direction of motion of the outer sleeve 112. The resulting outward movement of the second rack member 145 pulls the cable 100 of the actuator member 24 laterally, to pivotally move the first and second arm members 76, 78, as described hereinabove in connection with the description of the safety latch assembly, and releases the support member 12 therefrom.

Alternative Embodiment of the Spare Tire Storage and Retrieval System

As an alternative to the preferred system 10 according to the present invention, a system (not shown) could be designed using only one operating means in the release and control system, and dispensing with the need for the outer sleeve and its associated cable and drive system. Instead, in another alternative embodiment of a safety latch assembly, an annular actuator member could be provided attached to the spool of the winch assembly for rotation therewith. The annular actuator member could have a lower edge with an eccentric surface which moved up and down as the actuator member spun around. Suitable hardware could be operatively associated with the annular actuator member to use it to drive a release means for opening a safety latch.

Although the present invention has been described herein with respect to preferred embodiments thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

I claim:

1. An apparatus for use in storing a spare tire beneath a vehicle, said apparatus comprising a support member for supportively holding a spare tire thereon, said support member comprising:
    a) a platform section for supporting a wheel of a spare tire thereon, said platform section having a cutout area formed therein, said cutout area having an upper cutout portion and a lower cutout portion; and
    b) an insert which fits engagingly into said cutout area of said platform section, said insert comprising:
        an upper portion which is dimensioned to fit into said upper cutout portion of said platform section; and
        a lower portion which is dimensioned to fit into said lower cutout portion and which is affixed to said upper portion of said insert, said lower portion being wider than said upper portion;
        wherein said insert is connectable to a flexible member of a winch assembly, and said platform section and said insert jointly define a continuous upper surface when fitted together for fully closing a central opening of a wheel of the spare tire.

2. The apparatus of claim 1, wherein said platform section has an upper surface, and further comprising a sealing material provided on said upper surface thereof.

3. The apparatus of claim 1, wherein said support member further comprises:
    a shank portion attached to and extending upwardly from a central area of said platform section and having a vertical groove formed therein for receiving a part of a flexible member; and
    an enlarged shoulder portion disposed at the top of said shank portion, said shoulder portion having a cutout notch formed therein which is coextensive with said vertical groove of said shank portion.

4. The apparatus of claim 3, wherein said platform section has an upper surface, and further comprising a sealing material thereon at said upper surface thereof.

5. An apparatus for use in storing a spare tire beneath a vehicle, said apparatus comprising a support member for supportively holding a spare tire thereon, said support member comprising:
    a) a platform section for supporting a wheel of a spare tire thereon, said platform section having a cutout area formed therein, said cutout area having an upper cutout portion and a lower cutout portion;
    b) an insert which fits engagingly into said cutout area of said platform section, said insert comprising:
        an upper portion which is dimensioned to fit into said upper cutout portion of said platform section; and
        a lower portion which is dimensioned to fit into said lower cutout portion and which is affixed to said upper portion of said insert, said lower portion being wider than said upper portion;
        wherein said insert is connectable to a flexible member of a winch assembly; and
    c) a safety latch assembly for releasably engaging said support member.

6. The apparatus of claim 5, wherein said safety latch assembly comprises a water-resistant latch housing.

7. The apparatus of claim 6, wherein said latch housing has a lower surface for contacting a wheel section of a spare tire; and wherein said safety latch assembly comprises a water-resistant seal attached to said lower surface of said latch housing.

8. A safety latch assembly for supportively engaging a support member of a type having an upwardly extending shank and an enlarged shoulder portion disposed thereon at said top of said shank, said safety latch assembly comprising:
    a hollow latch housing having a side wall and a lower surface below said side wall;
    a first arm member disposed inside said latch housing and being pivotally attached to said side wall thereof, said first arm member having a top end with an inwardly extending first cam thereon, and having a bottom end with at least one inwardly extending latching finger thereon for extending below said enlarged shoulder portion of said support member;
    a second arm member disposed inside said latch housing and pivotally attached to said side wall thereof substantially opposite said first arm member, said second arm member having a top end with an inwardly extending second cam thereon, and having a bottom end with at least one inwardly extending latching finger thereon for extending below said enlarged shoulder portion of said support member, said second cam on said second arm member being disposed below and adjacent said first cam on said first arm such that when the bottom end of said first arm member is pivotally moved outwardly said first cam engages said second cam causing the bottom end of said second arm member to pivot outwardly.

9. The latch assembly of claim 8, further comprising sealing means disposed below said latch housing lower surface, for cooperating with a surface of a spare tire to resist water entry therepast.

10. The latch assembly of claim 8, further comprising means for urging said latching fingers toward one another.

11. The latch assembly of claim 8, wherein each of said first and second cams has a plurality of teeth formed thereon, said teeth of said second cam being intermeshingly engaged in said teeth of said second cam.

12. A release and control apparatus for a spare tire storage and retrieval system, comprising:
   latch release means for operating a safety latch assembly;
   rotatable means for operating a winch; and
   a water-resistant control housing, wherein portions of both of said latch release means and said rotatable operating means are disposed within said control housing, and said control housing is disposed remotely from the safety latch assembly and the spare tire.

13. The release and control apparatus of claim 12, wherein said apparatus further comprises an actuator member connected between said latch release means and said safety latch assembly for causing movement of the safety latch assembly;
   wherein said latch release operating means comprises:
      an outer sleeve slidably disposed in said control housing, said outer sleeve being operatively associated with said actuator member, so that inward movement thereof causes an outward pulling movement of said actuator member; and
      means for biasing said outer sleeve outwardly in said control housing, said means for biasing exerting a pushing force on said outer sleeve;
      and wherein said rotatable operating means comprises an inner sleeve rotatably mounted in said control housing.

14. The release and control apparatus of claim 13, further comprising a gear mechanism coupled between said outer sleeve and said actuator member, to initiate outward pulling movement of said actuator member in response to inward movement of said outer sleeve.

15. A storage and retrieval system for storing a spare tire beneath a vehicle, comprising:
   a support member for supportively holding a spare tire thereon;
   a winch assembly for raising and lowering said support member between a stored position and an accessible position thereof, said winch assembly comprising a flexible member attached to said support member;
   a safety latch assembly for supportively holding said support member in said stored position; and
   sealing means for resisting entry of water into selected components of said storage and retrieval system;
   said sealing means comprising a housing for said safety latch assembly having an open lower end adapted to sealingly engage an upper surface of a wheel of the spare tire, and an upper surface of said support member adapted to sealingly engage a lower surface of the wheel for preventing entry of moisture into the housing.

16. The storage and retrieval system of claim 15, wherein said sealing means further comprises at least one sealing member, disposed on at least one of said support member and said safety latch assembly, said sealing member being operatively engageable with a wheel of a spare tire.

17. The storage and retrieval system of claim 15, wherein said support member comprises an upwardly extending shank portion and an enlarged shoulder portion disposed at the top of said shank portion; and wherein said safety latch assembly comprises:
   a hollow latch housing having a side wall;
   a first arm member disposed inside said latch housing and being pivotally attached to said side wall thereof, said first arm member having a top end with an inwardly extending first cam thereon, and having a bottom end with at least one inwardly extending latching finger thereon for extending below said enlarged shoulder portion of said support member;
   a second arm member disposed inside said latch housing and pivotally attached to said side wall thereof substantially opposite said first arm member, said second arm member having a top end with an inwardly extending first cam thereon and having a bottom end with at least one inwardly extending latching finger thereon, for extending below said enlarged shoulder portion of said support member, said second cam on said second arm member being disposed below and adjacent said first cam on said first arm for movement thereby; and
   an actuator member attached to said first arm member for causing movement thereof.

18. The storage and retrieval system of claim 17, further comprising a release and control apparatus, comprising:
   latch release means for operating said safety latch assembly;
   rotatable means for operating said winch assembly; and
   a water-resistant control housing, wherein both of said latch release means and said rotatable operating means are disposed within said control housing.

19. The storage and retrieval system of claim 18, wherein said latch release operating means comprises:
   an outer sleeve slidably disposed in said control housing, said outer sleeve being operatively associated with said actuator member so that inward movement thereof causes an outward pulling movement of said actuator member; and
   means for biasing said outer sleeve outwardly in said control housing, said means for biasing exerting a pushing force on said outer sleeve;
   wherein said rotatable operating means comprises an inner sleeve rotatably mounted in said control housing.

20. The storage and retrieval system of claim 19, wherein said latch release operating means further comprises a gear mechanism coupled between said outer sleeve and said actuator member, to facilitate outward pulling of said actuator member in response to inward movement of said outer sleeve.

21. The storage and retrieval system of claim 20, wherein said gear mechanism comprises a rack and pinion subassembly disposed within said control housing, said rack and pinion subassembly comprising:
   a) a first rack member attached to the outer sleeve and having an axially outwardly facing surface with a plurality of teeth thereon;
   b) a pinion gear rotatably attached to the control housing and having an outer peripheral edge with teeth formed therearound, some of the teeth of said pinion gear being engaged with some of the teeth of said first rack member; and
   c) a second rack member slidably attached to the control housing and having an axially inwardly facing surface with a plurality of teeth thereon, some of the teeth of said pinion gear being engaged with some of the teeth of said second rack member.

22. A method of removing a spare tire from a support member, said support member comprising a first portion which is extendable through a wheel aperture of said spare tire, and a second portion which is detachably connected to said first portion and which is supportively and abuttingly disposed beneath a wheel of said spare tire, said method comprising the steps of:

a) moving said spare tire relative to said support member, to lift said wheel off of said second portion of said support member;
   b) separating said first and second portions of said support member; and
   c) moving said spare tire relative to said first portion of said support member, to pass said first portion through said wheel aperture;

said second portion of said support member comprising a platform section having a cutout portion, said first portion of the support member comprising an insert which fits into the cutout portion of the platform section, said platform section and said insert jointly define a continuous upper surface when fitted together, and a sealing member being disposed on said upper surface for cooperating with a lower surface of a wheel of said spare tire to form a water-resistant seal, and wherein initial movement of said spare tire relative to said support member displaces said sealing member from fully closing a central opening of said wheel of the spare tire.

23. The apparatus of claim 1, further comprising a safety latch assembly for releasably engaging said support member and a water resistant housing for said safety latch assembly, a lower surface of said housing being adapted to sealingly engage an upper surface of the wheel of the spare tire opposite to said platform section.

* * * * *

UNITED STATES PATENT AND TRADEMARK OFFICE
CERTIFICATE OF CORRECTION

PATENT NO : 6,079,932
DATED : 27 June 2000
INVENTOR(S): Bruce Alan Boucher

It is certified that error appears in the above-identified patent and that said Letters Patent are hereby corrected as shown below:

Column 2, line 2, change "fire" to --tire--.

Column 6, line 9, after "tire" insert --storage--;
 line 42, change "event in the event" to --even in the event--.

Column 8, line 15, change "on to" to --onto--.

Column 9, line 21, delete "is";
 line numbered between 47 and 48, change "fist" to --first--.

Column 10, line 32, change "spare tire 18" to --spare tire 16--;
 line 34, change "spare tire 18" to --spare tire 16--.

Column 12, line 14, change "118 to" to --118--.

Signed and Sealed this

Twenty-fourth Day of April, 2001

Attest:

NICHOLAS P. GODICI

Attesting Officer

Acting Director of the United States Patent and Trademark Office